United States Patent [19]

Insolio

[11] 4,030,195

[45] June 21, 1977

[54] SCORING DEVICE WITH EDGE GUIDE

[75] Inventor: Thomas A. Insolio, Bristol, Conn.

[73] Assignee: The Fletcher-Terry Company, Farmington, Conn.

[22] Filed: Sept. 29, 1976

[21] Appl. No.: 727,765

[52] U.S. Cl. ............................ 30/164.9; 30/164.95; 33/32 B

[51] Int. Cl.² ...................... B26B 3/08; B26D 3/08

[58] Field of Search ............... 30/164, 164.95, 292, 30/293, 294; 33/32 B, 32 C

[56] References Cited

UNITED STATES PATENTS

| | | | |
|---|---|---|---|
| 41,797 | 3/1864 | Van Deventer | 30/293 |
| 3,120,055 | 2/1964 | Baber | 30/164.9 |
| 3,191,464 | 6/1965 | Demler | 30/293 X |
| 3,812,748 | 5/1974 | Nausbaum | 30/164.95 |
| 3,875,664 | 4/1975 | Diner | 30/164.9 |

*Primary Examiner*—Al Lawrence Smith
*Assistant Examiner*—J.C. Peters
*Attorney, Agent, or Firm*—McCormick, Paulding & Huber

[57] ABSTRACT

The guide has a four sided cam, and a face of the cam engages the marginal side edge of a sheet placed on a work table. A square rod is slidably received in an axial opening in the cam, to be clamped in a predetermined position for scoring parallel the sheet edge. The rod is adapted to be inserted in four different orientations, with the result that the scoring tool is located at four different heights above the work table. This geometry sheets of four different thickness to be conveniently scored to a predetermined depth. A second rod holds a second tool suitable for scoring a second material.

6 Claims, 5 Drawing Figures

U.S. Patent   June 21, 1977   Sheet 1 of 2   4,030,195
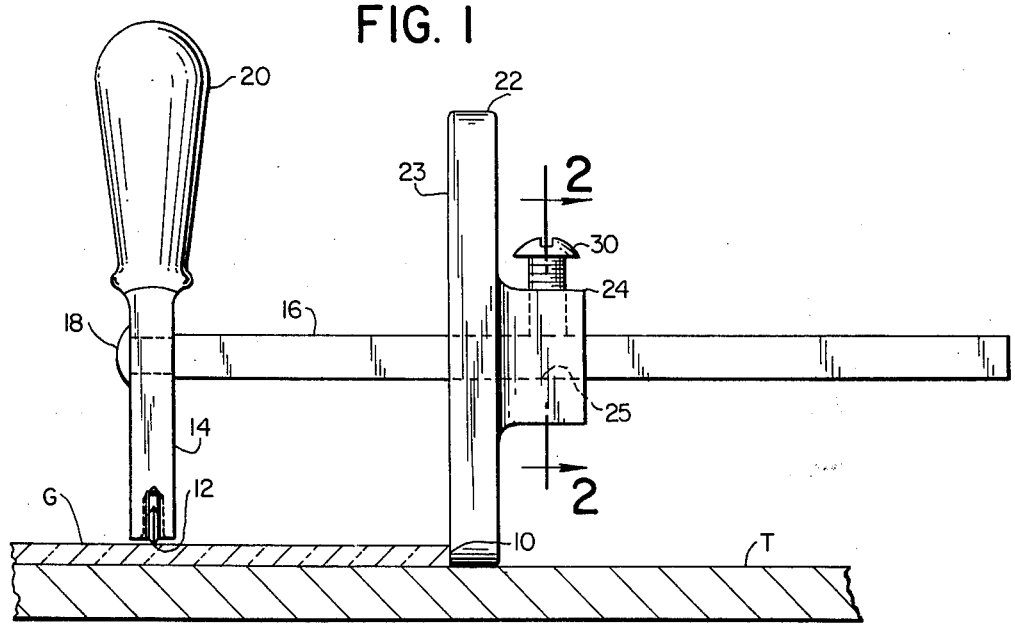
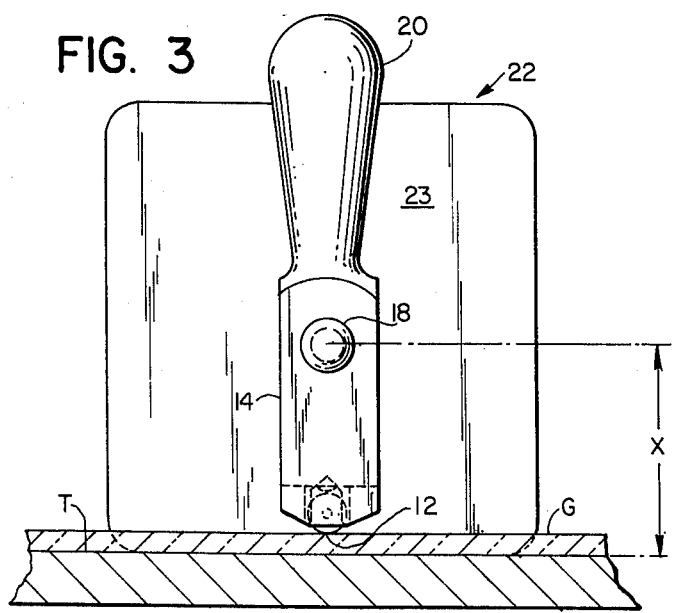
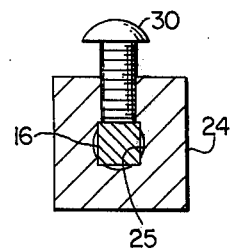

SCORING DEVICE WITH EDGE GUIDE

This invention relates generally to aids for trimming glass or plastic sheets, and deals more particularly with an edge guide which is adapted to be used with either a glass scoring wheel or a plastic scoring knife, and to so orient these scoring devices that sheets of varying thickness can be manually scored to a predetermined depth on a work table or the like.

The primary object of the present invention is to provide a device for assisting in the manual scoring of fracture-sensitive sheet material of different thicknesses.

In carrying out the foregoing object of the present invention the device disclosed is especially suitable for manually scoring fracture-sensitive sheet material adjacent one marginal edge of the sheet, and for guiding a scoring tool in order to keep the scoring tool parallel said sheet edge. The device includes a cam plate of irregular polygonal shape having a plurality of straight edges each of which is selectively engageable with a flat work table upon which the sheets to be scored are conveniently supported. A rod, also polygonal in shape, is slidably mounted in an axially extending opening provided for this purpose in the cam plate, and means is provided for clamping the rod in the plate at the desired location for trimming a predetermined quantity of material from the sheet. The rod has a cross-sectional shape such that the number of sides corresponds to the number of edges on the cam plate, with the result that the rod can be inserted in the cam plate in a number of predetermined positions corresponding to the number of side edges of the polygon.

Preferably, two such rods are provided, one having a pillar post in which a glass scoring wheel is mouned. The pillar post is preferably oriented generally perpendicular to the rod. A plastic scoring blade is provided in a second rod similar to the first so that either of the rods can be used in conjunction with the cam plate in order to score either glass or plastic to a predetermined depth. Variations in the thickness of the sheet material are accommodated by virtue of the various polygon sides. The cam plate is so designed that the distance between each of its sides and the center of the opening for receiving the rod varies in a predetermined manner, dictated by the thickness of the sheet material to be scored.

FIG. 1 is a side elevational view of the device when used to score glass supported on a work table.

FIG. 2 is a vertical sectional view taken generally on the line 2—2 of FIG. 1.

FIG. 3 is an end-on elevational view of the device illustrated in FIG. 1.

Figure 4:
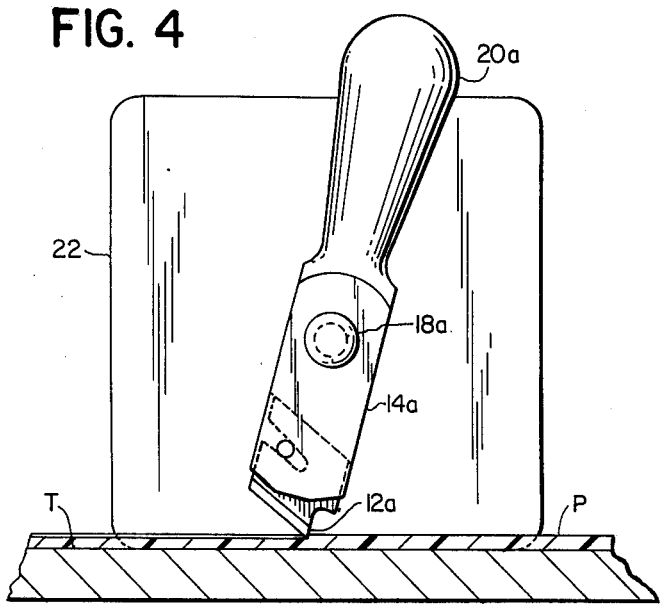
FIG. 4 is an end-on elevational view of the same cam plate illustrated in FIGS. 1 and 3, but with a plastic scoring knife and its associated support post, and an associated support inserted in the opening provided for this purpose in the cam plate.

Turning now to the drawings in greater detail, FIG. 1 shows a device constructed in accordance with the present invention and suitable for scoring glass sheet material G parallel to a marginal edge 10 of the glass sheet, and to a predetermined depth, suitable for subsequently breaking out the sheet of glass either over a table edge, or an anvil as is customary in the glass cutting art.

The present invention relates to the device for supporting the glass scoring wheel 12 at a predetermined elevation above the work table T upon which the glass sheet G is supported. The means for so supporting the scoring wheel 12 comprises a conventional pillar post 14 which post is secured to the end of rod 16 in fixed relationship by means of the rivet 18. The post 14 includes an upwardly extending portion 20 defining a handle, such that the user of the device can conveniently grip the handle 20 in order to score the glass sheet G, merely by drawing the device toward the user as is conventional practice with a hand-held glass cutter.

In accordance with the present invention, the scoring operation is facilitated by means of an edge guide in the form of a cam plate 22 having an inside face 23 the lower edge of which is adapted to engage the marginal edge 10 of the glass sheet G as the device is used in the manner described above. The cam plate 22 is of generally four sided quadrilateral configuration as best shown in FIG. 3, and it should be noted that this multisided, or polygon shaped configuration, is an essential element of the present invention. Further, this polygon is not regular, that is, the various sides of the generally square figure shown in FIG. 3 are not of equal length, but differ slightly from one another for the purpose to be described below. The cam plate 22 has a generally square central opening 25 which is provided in a generally square boss 24 best shown in FIG. 2. The central portion of the boss 24 thus defines the axially extending opening 25 quite precisely located with respect to the various sides of the cam plate 22. The generally polygon shaped opening 25 is of regular configuration, that is, each of the sides thereof are of the same linear dimension. Further, the number of sides of this polygon is identical to the number of sides for the cam plate 22, and as shown in FIG. 2, this opening is generally square, and more particularly is well adapted to receive a square rod 16 as shown. Thus, the rod 16 is adapted to be received in the opening 25 in any one of four different positions, each of which positions will result in placement of the scoring wheel 12 at a different height above the surface of the work table T. This geometry will permit the user to score glass sheets of four different thicknesses all of such glass sheets being scored to a predetermined depth dictated by the distance from the center line or axis of the opening 25 to an associated side edge of the quadrilaterally shaped cam plate 22. This distance is indicated generally at X in FIG. 3 and will vary depending upon which side edge of the cam plate 22 is placed in engagement with the work table surface in order to position the scoring wheel 12 at the desired height above the work table surface for scoring a glass sheet G of predetermined thickness. It will be apparent that there are four possible distances between the center line of the opening 25 in the cam plate 22 and each of the associated four sides of said cam plate. Therefore, glass sheets of four different thicknesses can be scored with the aid of the device illustrated in FIGS. 1–3 inclusively. The rod 16 is adapted to be clamped to the edge guide cam 22 by set screw 30.

Figure 5:
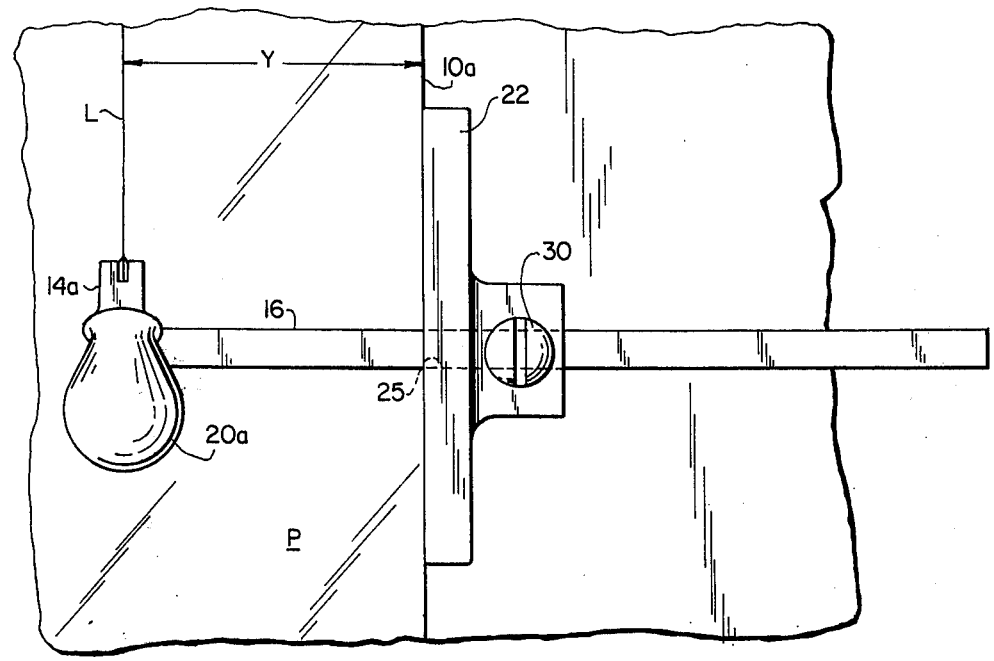
FIG. 5 is a plan view of the alternative arrangement illustrated in FIG. 4.

Turning next to a description of the alternative arrangement illustrated in FIGS. 4 and 5, the same reference numerals have been utilized in these views to illustrate the same components, and subscripts used to illustrate additional structure similar to that referred to above with reference to FIGS. 1–3 inclusively. As illustrated in FIG. 4 the cam plate 22 has an inner face 23 adapted to abut the marginal side edge 10a of a plastic sheet P to be scored. The plastic sheet P is placed on the same work table T, but in place of the square rod 16 described above a square rod 16a of the same size is provided with a plastic scoring knife 12a mounted in a post 14a, which post has an upper portion defining a handle 20a. The post 14a is riveted to the end of the square rod 16a as indicated generally at 18a in FIG. 4. It will be apparent that this plastic scoring post can be utilized in any one of four positions relative to the cam plate 22 such that plastic sheets of four different thicknesses can be conveniently scored to a predetermined depth simply by utilizing the device in any one of four possible positions. As in the previously described embodiment, means is provided for clamping the cam plate 22 to its associated rod 16a in order to score along a line L located a predetermined distance from the marginal side edge 10a of the plastic sheet P.

I claim:

1. A device for manually scoring fracture sensitive sheet adjacent to one edge of the sheet and for guiding a scoring tool to keep it parallel the sheet edge, said device comprising a cam plate of irregular polygon shape having a plurality of guide edges selectively engageable with a flat work table upon which the sheet to be scored is supported, a rod slidably mounted in an axially extending opening, said cam plate, having a cross sectonal shape which is that of a regular polygon, said polygon shaped cam plate being similar to said rod cross section in that both have the same number of side edges, said rod adapted to be received in alternative orientations in said cam plate opening, and a scoring tool affixed to one end of said rod and projecting radially outwardly therefrom to engage the surface of the sheet to be scored.

2. The device according to claim 1 further characterized by means for releasably clamping said rod in said cam plate opening, and an inside face of said cam plate perpendicular to said rod and adapted to abut the edge of the sheet to be trimmed.

3. The device according to claim 2 wherein said side edges of said cam plate are all at slightly different distances from the longitudinal axis of said rod to allow scoring sheets of different thicknesses to the same depth.

4. The device according to claim 3 wherein said number of sides for said polygon shaped cam plate and rod comprises four, said rod being square in cross section and slidably received in said cam plate opening in four alternative positions.

5. The device according to claim 4 wherein said scoring tool comprises a glass scoring wheel, and a post supporting said wheel in fixed perpendicular relationship to said square rod.

6. The device according to claim 5 and further characterized by a second rod also of square cross section and adapted to be slidably received in said cam plate opening, and said second rod having a second post affixed thereto, and a plastic scoring knife blade at the lower end of said second post.

* * * * *